United States Patent
Zhang et al.

(10) Patent No.: US 8,886,050 B2
(45) Date of Patent: Nov. 11, 2014

(54) WAVELENGTH DIVISION MULTIPLEXING SYSTEM, METHOD AND DEVICE FOR ITS RESIDUAL DISPERSION COMPENSATION

(75) Inventors: Likun Zhang, Shenzhen (CN); Jiaying Wang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 1079 days.

(21) Appl. No.: 12/282,140

(22) PCT Filed: Jan. 10, 2007

(86) PCT No.: PCT/CN2007/000090
§ 371 (c)(1),
(2), (4) Date: Apr. 14, 2009

(87) PCT Pub. No.: WO2007/104211
PCT Pub. Date: Sep. 20, 2007

(65) Prior Publication Data
US 2009/0202248 A1 Aug. 13, 2009

(30) Foreign Application Priority Data
Mar. 10, 2006 (CN) .......................... 2006 1 0011478

(51) Int. Cl.
*H04J 14/02* (2006.01)
*H04B 10/12* (2006.01)
(Continued)

(52) U.S. Cl.
CPC .... *H04B 10/25133* (2013.01); *H04B 2210/252* (2013.01); *H04B 2210/254* (2013.01);
(Continued)

(58) Field of Classification Search
CPC ........... H04B 10/2507; H04B 10/2513; H04B 10/25133; H04B 10/2519; H04B 10/2525; H04B 10/25253; H04B 10/60; H04B 10/61; H04B 10/616; H04B 10/6161; H04B 10/66; H04B 10/67; H04B 10/671; H04B 10/69; H04B 10/6971; H04B 10/6972; H04B 2001/06; H04B 2001/10; H04B 2001/1027; H04B 2001/1045
See application file for complete search history.

(56) References Cited

U.S. PATENT DOCUMENTS 4,677,618 A * 6/1987 Haas et al. .................... 714/700
6,871,024 B2 3/2005 Mikami et al.
(Continued)

FOREIGN PATENT DOCUMENTS

| CN | 1432229 A | 7/2003 |
|---|---|---|
| CN | 1479478 | 3/2004 |

(Continued)

OTHER PUBLICATIONS

International Search Report from Application No. PCT/CN2007/000090, dated May 17, 2007.
(Continued)

*Primary Examiner* — Darren E Wolf
(74) *Attorney, Agent, or Firm* — Bright IP Law Offices

(57) ABSTRACT

The present invention provides a wavelength division multiplexing system and a method and device for its residual dispersion compensation, wherein the device for residual dispersion compensation of wavelength division multiplexing system comprises: a performance parameter detecting device for receiving and detecting performance parameter of receiving terminal optical signal and sending detecting result of the performance parameter to a central control device; the central control device for deciding a dispersion regulating mode of a tunable dispersion compensator according to the detecting result of the performance parameter and sending the dispersion regulating mode to a tunable dispersion compensator control device through control signaling; and the tunable dispersion compensator control device for receiving the control signaling sent by the central control device and adjusting dispersion compensation amount of the tunable dispersion compensator according to the control signaling in order to make residual dispersion of wavelength channels to satisfy requirements of dispersion tolerance of an optical receiver. Therefore, the present invention optimizes residual dispersion of each channel and solves the problem of transmission performance deterioration caused by residual dispersion of long distance optical transmission system.

19 Claims, 8 Drawing Sheets

(51) Int. Cl.
*H04B 10/04* (2006.01)
*H04B 10/06* (2006.01)
*H04B 10/2513* (2013.01)
*H04B 10/079* (2013.01)

(52) U.S. Cl.
CPC ....... *H04B 10/07951* (2013.01); *H04J 14/0221* (2013.01); *H04B 2210/256* (2013.01)
USPC ............. 398/147; 398/81; 398/148; 398/149; 398/192; 398/193; 398/194; 398/195; 398/212

(56) References Cited

U.S. PATENT DOCUMENTS

| | | | |
|---|---|---|---|
| 6,925,262 | B2 | 8/2005 | Ooi et al. |
| 2001/0013966 | A1* | 8/2001 | Ishida et al. ................... 359/161 |
| 2002/0154353 | A1* | 10/2002 | Heath et al. ................... 359/124 |
| 2003/0210908 | A1* | 11/2003 | Levy et al. ....................... 398/33 |
| 2003/0223760 | A1* | 12/2003 | Takahara et al. .............. 398/147 |
| 2004/0141756 | A1* | 7/2004 | Nakamura et al. ............ 398/147 |
| 2005/0175279 | A1* | 8/2005 | Nakajima et al. ............... 385/24 |
| 2005/0213986 | A1* | 9/2005 | Yoshimoto et al. ........... 398/147 |
| 2007/0242956 | A1* | 10/2007 | Inui et al. ...................... 398/177 |

FOREIGN PATENT DOCUMENTS

| | | |
|---|---|---|
| CN | 1518249 | 8/2004 |
| CN | 1674475 | 9/2005 |
| EP | 0 700 178 A2 | 3/1996 |
| EP | 0 812 075 A2 | 12/1997 |
| EP | 0 902 558 A2 | 3/1999 |
| EP | 1347589 A1 | 3/2002 |
| EP | 1 385 281 A2 | 1/2004 |

OTHER PUBLICATIONS

Extended European Search Report for EP Application No. 07702022.0 mailed Feb. 2, 2012.

EPO Official Communication for EP Application No. 07702022.0 mailed Oct. 10, 2013.

* cited by examiner

US 8,886,050 B2

WAVELENGTH DIVISION MULTIPLEXING SYSTEM, METHOD AND DEVICE FOR ITS RESIDUAL DISPERSION COMPENSATION

CROSS REFERENCE TO RELATED APPLICATIONS OR PRIORITY CLAIM

This application is a national phase of International Application No. PCT/CN2007/000090, entitled "WAVELENGTH DIVISION MULTIPLEXING SYSTEM AND RESIDUAL DISPERSION COMPENSATING DEVICE AND METHOD THEREOF", which was filed on Jan. 10, 2007, and which claims priority of Chinese Patent Application No. 200610011478.X, filed Mar. 10, 2006.

FIELD OF THE INVENTION

The present invention relates to wavelength division multiplexing system, method and device for its residual dispersion compensation, more specifically, relates to wavelength division multiplexing system, method and device for residual dispersion compensation of each channel after dispersion compensation is performed to the multiplexing section of wavelength division multiplexing optical transmission system.

BACKGROUND OF THE INVENTION

With single channel rate of wavelength division multiplexing optical transmission system increasing continually (e.g. the signal rates of main transmission networks are mostly updated from 2.5 Gb/s to 10 Gb/s at present), as one of the important physical characteristics of single mode fiber of optical transmission media, dispersion has become a main factor restricting transmission distance of high speed optical transmission system.

Taken the dispersion characteristic of common G.652 single mode fiber used in wavelength division multiplexing system (WDMS) as an example, the zero dispersion wavelength is near 1310 nm as shown by the dashed in FIG. 1, while wavelength division multiplexing optical transmission system usually works near 1550 nm of wave band C. More specifically, the wavelength range of wave band C is from 1529.16 nm to 1560.61 nm and the dispersion coefficient near the transmission wavelength of 1550 nm is 17 ps/nm/km. To reach 640 km transmission required by OSNR, the dispersion will accumulate to 11000 ps/nm much larger than the dispersion tolerance value of 10 Gb/s laser light source (e.g. the dispersion tolerance value of 80 km electric absorption laser is 1600 ps/nm at present). Therefore, the high speed wavelength division optical transmission system can satisfy the actual transmission requirements only after dispersion compensation. The real curve in FIG. 1 is a dispersion coefficient curve of fiber after dispersion compensation. Obviously, dispersion compensation fiber can periodically make the accumulating dispersion of fiber link to reach minimum only near a certain central wavelength of wave band C. However, the dispersion coefficient of other wavelengths on two sides of the central wavelength, especially edge wavelengths (e.g. 1529.16 nm and 1560.61 nm) is large and after transmission of multi-section, residual dispersion will increase greatly.

At present, the high speed wavelength multiplexing optical transmission system can usually perform dispersion compensation in multiplexing section or single channel. When performing dispersion compensation in multiplexing section, as shown in FIG. 2, DCM (dispersion compensating module) is periodically added in the transmission link, comprising:

Forward dispersion compensation mode, which uses forward dispersion compensation module (fiber dispersion compensation module is set before post optical amplifier) to perform dispersion pre-compensation;

Circuit dispersion compensation mode, which uses circuit dispersion compensation module (fiber dispersion compensation module is set between circuit optical amplifiers) to perform line dispersion compensation;

Backward dispersion compensation mode, which uses backward dispersion compensation module (fiber dispersion compensation module is set after of optical pre-amplifier) to perform dispersion post-compensation.

For wavelength division multiplexing optical transmission system of middle or short distance, the above methods can solve the problem of fiber dispersion to make the residual dispersion of transmission system within the range of dispersion tolerance permitted by the receiver.

However, as the relative dispersion slopes between common fiber and dispersion compensation module are not always the same, in the condition of large amount of channels and long transmission distance, even if residual dispersion of a channel of a certain wavelength is completely optimized to have the lowest bit error rate, residual dispersion of other channels (especially edge wavelength channels) may also be large, which can hardly avoid bit errors after transmission. FIG. 3 is a schematic view showing residual dispersion of wavelength division multiplexing optical transmission system, wherein D+ and D− are the ranges of dispersion tolerance permitted by receiver and D+max and D−max respectively represent the accumulating maximums of positive residual dispersion and negative residual dispersion. As shown in FIG. 3 dispersion compensation fiber can only compensate the accumulating dispersion of a certain central wavelength to minimum, while large accumulating residual dispersion still exits in other central wavelengths. Therefore, even if tunable dispersion compensator is used in the multiplexing section of wavelength division system, it is difficult to exactly compensate dispersion of all channels to optimum, so that over-compensation and lack-compensation of dispersion of each channel can hardly be avoided. The accumulation of residual dispersion is very harmful to optical transmission system of super long distance and further even break down the optical transmission system.

When performing dispersion compensation on each wavelength channel respectively with dispersion compensation modules with different compensation amounts in the wavelength channel layer, the dispersion compensation modules are usually integrated at receiving terminal of wavelength division multiplexing optical transmission system, which has compensational function to the effect of residual dispersion of the system. FIG. 4 shows a method of residual dispersion compensation of high speed wavelength multiplexing optical transmission system using EDC (electrical dispersion compensation) device.

However, the problem of the method above is: the dispersion compensation amount of electrical dispersion compensation device is fixed and very limited, which can reduce the effect brought by system residual dispersion in some degree, but can not essentially solve the problem of residual dispersion existing in the system and dynamically regulate dispersion compensation amount of each wavelength channels of wavelength division multiplexing system. As its dispersion compensation amount is not adjustable, this method lacks flexibility in the application of actual wavelength division multiplexing optical transmission system.

SUMMARY OF THE INVENTION

The object of the present invention is to provide a wavelength division multiplexing system and method and device for its residual dispersion compensation, which uses a tunable dispersion compensator to compensate the residual dispersion of the channel layer compensated by a fiber dispersion compensation module of multiplexing section of wavelength division multiplexing optical transmission system to optimize residual dispersion of each channel and solve the problem of deterioration of transmission performance caused by residual dispersion in long-distance optical transmission system.

To achieve the above object, according to one aspect of the present invention, the present invention provides a device for residual dispersion compensation of wavelength division multiplexing system, which comprising a performance parameter detecting device, a central control device and a tunable dispersion compensator control device, wherein the performance parameter detecting device is used for receiving and detecting performance parameter of receiving terminal optical signal and sending detecting result of the performance parameter to the central control device; the central control device is used for deciding a dispersion regulating mode of a tunable dispersion compensator according to the detecting result of the performance parameter and sending the dispersion regulating mode to the tunable dispersion compensator control device through control signaling; and the tunable dispersion compensator control device is used for receiving the control signaling sent by the central control device and adjusting dispersion compensation amount of the tunable dispersion compensator according to the control signaling in order to make residual dispersion of wavelength channels to satisfy the requirements of dispersion tolerance of an optical receiver.

According to one aspect of the present invention, the device for residual dispersion compensation of wavelength division multiplexing system further comprises an optical signal control device connected with the central control device through digital communication network for adjusting and controlling a sending terminal light source according to the control signaling to make residual dispersion of the wavelength channels to satisfy requirements of the optical receiver. Wherein, the performance parameter can be bit error rate of the receiving terminal optical signal or Q value of receiving terminal optical signal.

According to one aspect of the present invention, the performance parameter detecting device comprises a Q value detecting device, a channel switch and a prismatic device, which are connected ordinally, wherein the Q value detecting device is used for detecting Q value of the receiving terminal optical signal and sending detecting result of Q value to the central control device; the prismatic device set before a receiver is used for splitting a part of light from the receiving terminal optical signal and sending the part of light to the Q value detecting device through the channel switch; and the channel switch connected with and controlled by the tunable dispersion compensator control device is used for switching wavelength channels in the process of residual dispersion adjustment.

Wherein, the performance parameter can be residual dispersion amount of an actual fiber channel of the receiving terminal optical signal.

According to one aspect of the present invention, the performance parameter detecting device comprises an actual residual dispersion detecting device, a channel switch and a prismatic device, which are connected ordinally, wherein the actual residual dispersion detecting device is used for detecting residual dispersion amount of an actual fiber channel of the receiving terminal optical signal and sending detecting result of residual dispersion amount of the actual fiber channel to the central control device; the prismatic device set before a receiver is used for splitting a part of light from the receiving terminal optical signal and sending the part of light to the actual residual dispersion detecting device through the channel switch; and the channel switch connected with and controlled by the tunable dispersion compensator control device is used for switching wavelength channels in the process of residual dispersion adjustment.

Additionally, according to one aspect of the present invention, the performance parameter detecting device comprises an actual residual dispersion detecting device, a tunable filter and a prismatic device, which are connected ordinally, wherein the actual residual dispersion detecting device is used for detecting residual dispersion amount of an actual fiber channel of the receiving terminal optical signal and sending detecting result of residual dispersion amount of the actual fiber channel to the central control device; the prismatic device is used for splitting a part of light from multiplexing section layer before a receiver and sending the part of light to the actual residual dispersion detecting device through the tunable filter; and the tunable filter connected with and controlled by the tunable dispersion compensator control device is used for switching wavelength channels in the process of residual dispersion adjustment.

Another aspect of the present invention further provides a wavelength division multiplexing system, comprising an optical signal sending subsystem, an optical signal multiplexing section transmission subsystem and an optical signal receiving subsystem, and further comprising a device for residual dispersion compensation of wavelength division multiplexing system, which comprises a performance parameter detecting device, a central control device and a tunable dispersion compensator control device, wherein the performance parameter detecting device is used for receiving, and detecting performance parameter of receiving terminal optical signal and sending detecting result of the performance parameter to the central control device; the central control device is used for deciding a dispersion adjusting mode according to the detecting result of the performance parameter and sending the dispersion adjusting mode to the tunable dispersion compensator control device through control signaling; and the tunable dispersion compensator control device is used for adjusting dispersion compensation amount of a tunable dispersion compensator of a receiving terminal of wavelength division multiplexing system according to the control signaling to make residual dispersion of wavelength channels to satisfy requirements of an optical receiver.

According to another aspect of the present invention, the device for residual dispersion compensation of wavelength division multiplexing system further comprises a sending terminal optical signal control device connected with the central control device through digital communication network for adjusting and controlling a sending terminal light source according to the control signaling to make residual dispersion of the wavelength channels to satisfy requirements of an optical receiver.

Wherein, the performance parameter can be bit error rate or Q value of the receiving terminal optical signal.

Additionally, according to another aspect of the present invention, the performance parameter detecting device comprises a Q value detecting device, a channel switch and a prismatic device, which are connected ordinally, wherein the Q value detecting device is used for detecting Q value of the receiving terminal optical signal and sending the detecting result of the Q value to the central control device; the prismatic device set before a receiver is used for splitting a part of light from the receiving terminal optical signal and sending the part of light to the Q value detecting device through the channel switch; and the channel switch connected with and controlled by the tunable dispersion compensator control device is used for switching wavelength channels in the process of residual dispersion adjustment.

Wherein, the performance parameter can be residual dispersion amount of an actual fiber channel of the receiving terminal optical signal.

According to another aspect of the present invention, the performance parameter detecting device comprises an actual residual dispersion detecting device, a channel switch and a prismatic device, which are connected ordinally, wherein the actual residual dispersion detecting device is used for detecting residual dispersion amount of an actual fiber channel of the receiving terminal optical signal and sending detecting result of residual dispersion amount of the actual fiber channel to the central control device; the prismatic device set before a receiver is used for splitting a part of light from the receiving terminal optical signal and sending the part of light to the actual residual dispersion detecting device through the channel switch; and the channel switch connected with and controlled by the tunable dispersion compensator control device is used for switching wavelength channels in the process of residual dispersion adjustment.

Additionally, according to another aspect of the present invention, the performance parameter detecting device comprises an actual residual dispersion detecting device, a tunable filter and a prismatic device, which are connected ordinally, wherein the actual residual dispersion detecting device is used for detecting residual dispersion amount of an actual fiber channel of the receiving terminal optical signal and sending detecting result of residual dispersion amount of the actual fiber channel to the central control device; the prismatic device is used for splitting a part of light from multiplexing section layer before a receiver and sending the part of light to the actual residual dispersion detecting device through the tunable filter; and the tunable filter connected with and controlled by the tunable dispersion compensator control device is used for switching wavelength channels in the process of residual dispersion adjustment.

Another aspect of the present invention further provides a method of residual dispersion compensation of wavelength division multiplexing system, comprising the following steps:

Step A: a performance parameter detecting device receiving and detecting performance parameter of receiving terminal optical signal and sends the detecting result of performance parameter to a central control device;

Step B: the central control device deciding a dispersion regulating mode according to detecting result of the performance parameter and sending the dispersion regulating mode to a tunable dispersion compensator control device through control signaling;

Step C: the tunable dispersion compensator control device adjusting dispersion compensation amount of a tunable dispersion compensator of a receiving terminal of wavelength division multiplexing system according to the control signaling in order to make residual dispersion of wavelength channels to satisfy the requirements of an optical receiver.

Wherein, the performance parameter can be bit error rate, Q value or residual dispersion amount of an actual fiber channel of the receiving terminal optical signal etc.

Yet another aspect of the present invention provides a method of residual dispersion compensation of wavelength division multiplexing system comprising the following steps: step A, adjusting residual dispersion of two end wavelength channels of the system according to channel number of system; step B, adjusting residual dispersion of a middle wavelength channel; and step C, regulating dispersion compensation amount of channels adjacent to the two end wavelength channels or the middle wavelength channel according to regulating amount of dispersion compensation of the two ends and the middle wavelength channels obtained from the step A and step B.

The method and device for adjusting residual dispersion compensation of wavelength division multiplexing system of the present invention achieves the dynamic control of residual dispersion of wavelength division multiplexing optical transmission system, effectively solves the technical problem of residual dispersion accumulation of wavelength division multiplexing optical transmission system with large tolerance and long distance and realizes super long distance transmission of wavelength division multiplexing system with large tolerance by detecting performance parameter of the receiving terminal optical signal and dynamically feeding back and regulating the tunable dispersion compensator.

DETAILED DESCRIPTION OF THE PREFERRED EMBODIMENTS

Figure 1:
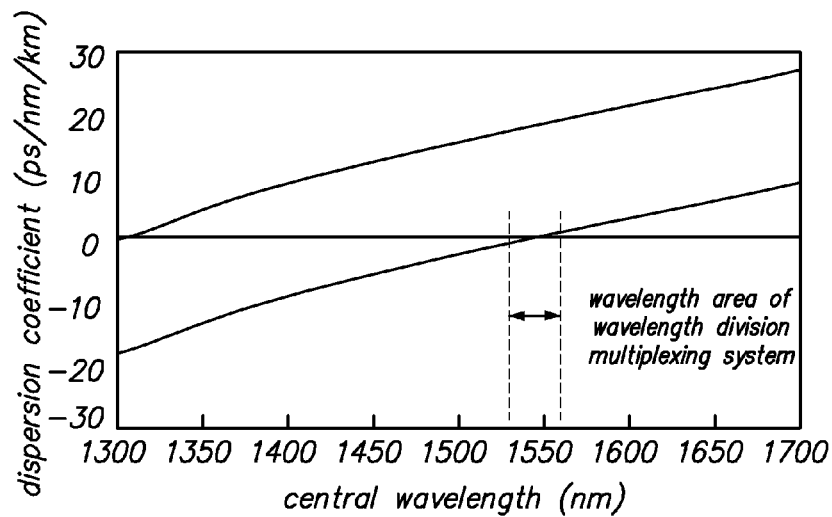
FIG. 1 is a curve chart of dispersion coefficient characteristic of G.652 fiber.
Figure 2:
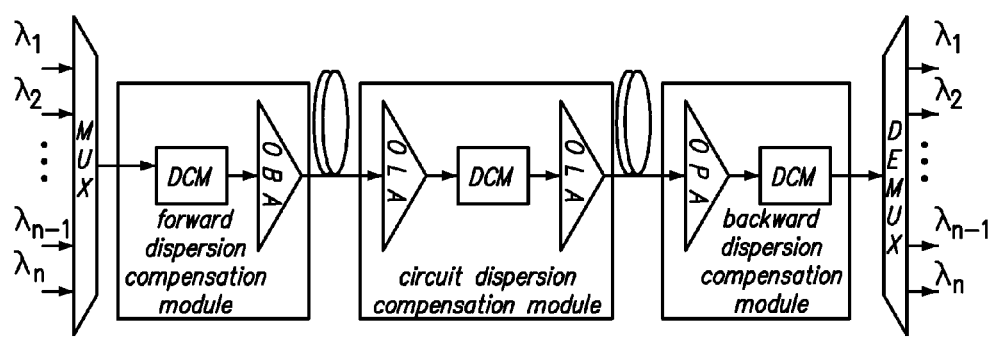
FIG. 2 is a schematic view showing the performing of dispersion compensation in the multiplexing section of high speed wavelength division multiplexing optical transmission system at present.
Figure 3:
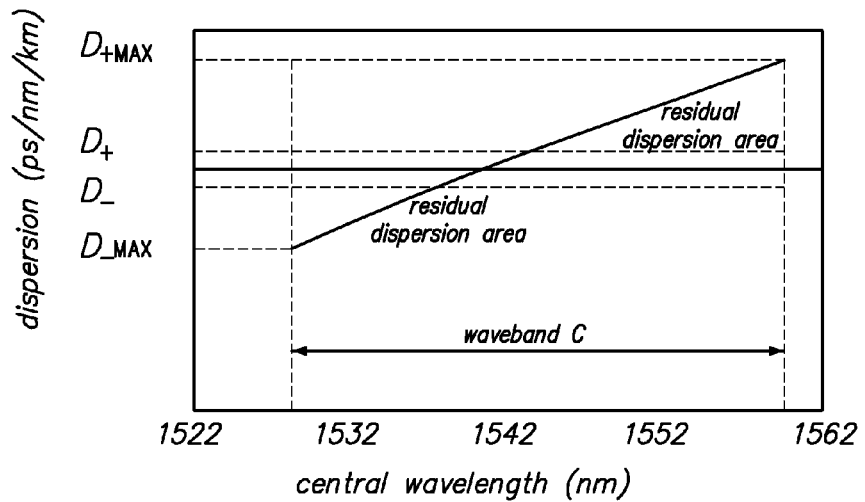
FIG. 3 is a schematic view showing residual dispersion of wavelength division multiplexing optical transmission system after dispersion compensation.
Figure 4:
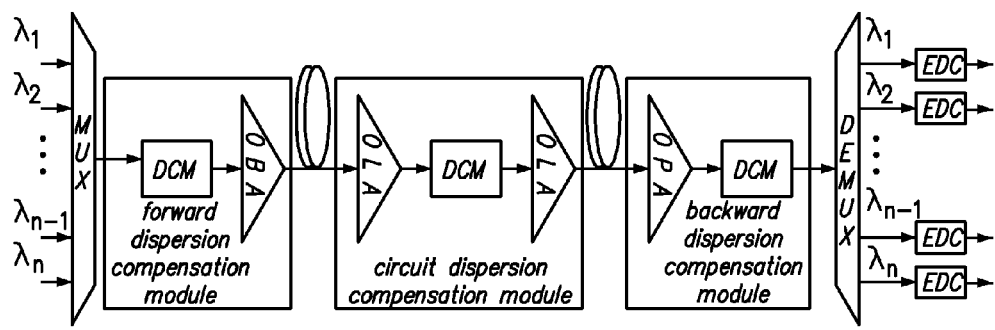
FIG. 4 shows the high speed wavelength division multiplexing optical transmission system performing residual dispersion compensation with an EDC device.
Figure 5:
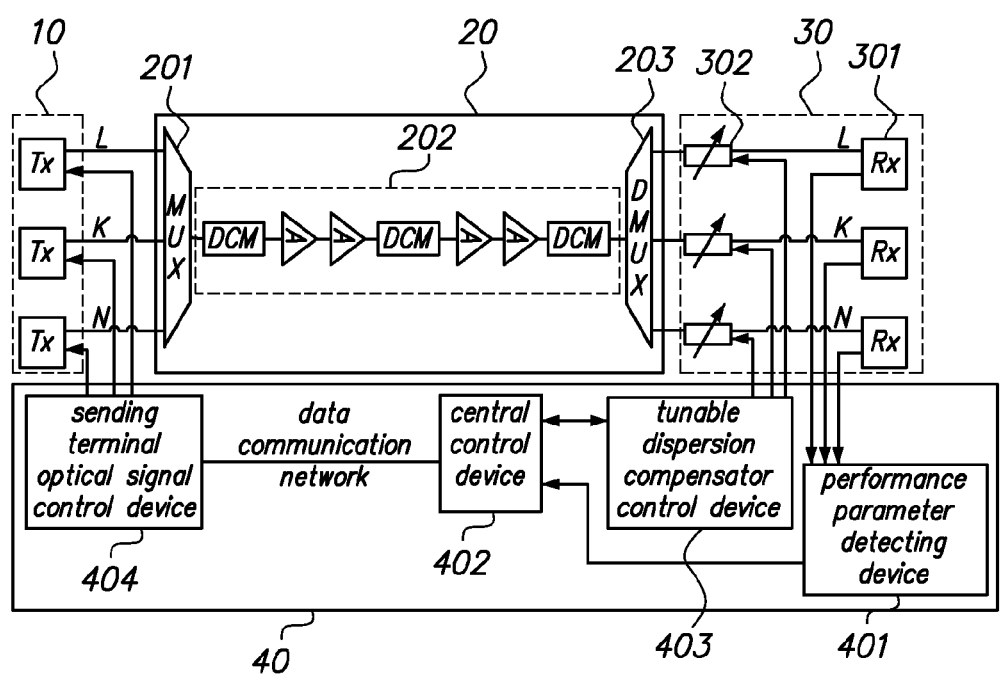
FIG. 5 is a structure schematic view of wavelength division multiplexing system of the present invention.

FIG. 5 is a structure schematic view of wavelength division multiplexing system of the present invention. As shown in FIG. 5, the wavelength division multiplexing system comprises a optical signal sending subsystem 10, a optical signal multiplexing section transmission subsystem 20 and a optical signal receiving subsystem 30, which are connected ordinally, wherein:

The optical signal multiplexing section transmission subsystem 20 comprises a combiner 201, a dispersion compensation module 202 and a splitter 203, which are connected ordinally. As shown in FIG. 5, the dispersion compensation module comprises forward dispersion compensation module mode, line dispersion compensation module mode and backward dispersion compensation module mode. In the actual application, the combination of one or more of the three is possible.

The optical signal receiving subsystem 30 comprises a optical receiver 301 (Rx) and a tunable dispersion compensator 302. The tunable dispersion compensator 302 set before the optical receiver 301 of each wavelength channel of receiving terminal and connects the optical receiver 301 of each wavelength channel with the splitter 203.

Additionally, wavelength division multiplexing system further comprises a residual dispersion compensation subsystem 40 for deciding dispersion regulating mode according to performance parameter of optical signal received by Rx and adjusting and controlling the tunable dispersion compensator 302 and the optical emitter (Tx) in the optical signal sending subsystem 10 according to the decided dispersion regulating mode to achieve dynamic control of dispersion compensation and finally to make optical signal to satisfy requirements of dispersion tolerance of an optical receiver.

As shown in FIG. 5, the residual dispersion compensation subsystem 40 comprises: a performance parameter detecting device 401, a central control device 402, a tunable dispersion compensator control device 403 and a sending terminal optical signal control device 404, wherein:

The performance parameter detecting device 401 is used for receiving and detecting the performance parameter sent by the optical receiver Rx and sending the detecting result of performance parameter to the central control device 402.

The central control device 402 is used for deciding a dispersion regulating mode according to the detecting result of performance parameter and sending the dispersion regulating mode to the tunable dispersion compensator control device 403 and the sending terminal optical signal control device 404 through control signaling.

The tunable dispersion compensator control device 403 is used for adjusting dispersion compensation amount of the tunable dispersion compensator of receiving terminal according to the control signaling of the central control device 402.

The sending terminal optical signal control device 404 can be connected to the central control device 402 through DCN (Data Communication Network) and is used for regulating and controlling sending terminal light source according to the control signaling of the central control device 402. For example, enable the electric dispersion compensation function of sending terminal light source. If electric dispersion compensation of the sending terminal is tunable, then object dispersion compensation value of the sending terminal can be adjusted and can directly control the light sending terminal to sending PRBS signals with a certain length sequence modulated etc. As the regulating and controlling of sending terminal is not a necessary process, then this process is not included in the flow chart as shown in FIG. 6.

Wherein, the tunable dispersion compensator and sending terminal light source are respectively adjusted and controlled by the tunable dispersion compensator control device 403 and the sending terminal optical signal control device 404, which achieves dynamic control of dispersion compensation and makes an optical signal of receiving terminal to satisfy requirements of an optical receiver.

Figure 6:
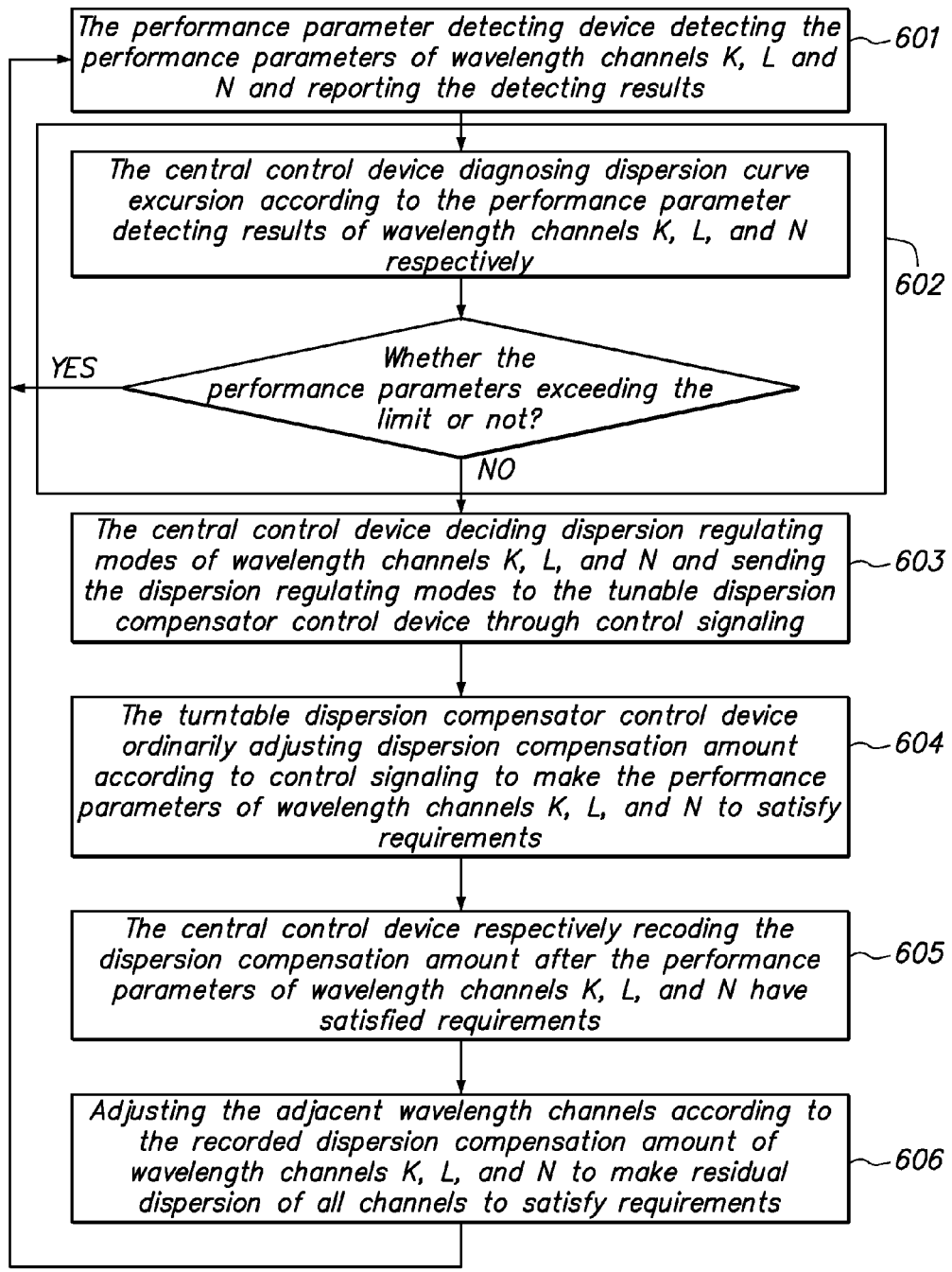
FIG. 6 is a flow chart showing the method for residual dispersion compensation of wavelength division multiplexing system of the present invention.

FIG. 6 is a flow chart showing the method of residual dispersion compensation of wavelength division multiplexing system of the present invention. FIG. 6 will be described in combination with FIG. 5. As shown in FIG. 6, the following steps are included:

Step 601, the performance parameter detecting device 401 respectively detects the performance parameters of reference wavelength channel K and edge wavelength channels L and N and reports the detecting result of the performance parameters to the central control device 402.

Step 602, the central control device 402 diagnoses dispersion curve excursion according to the performance parameter detecting result sent by the performance parameter detecting device 401 and judges whether the performance parameters exceeds the limit. If "yes", proceed to step 603, otherwise return to step 601 and continue detecting performance parameters and reporting the result.

Step 603, the central control device 402 decides dispersion regulating modes according to the detecting results of performance parameters of reference wavelength channel K and edge wavelength channels L and N respectively, and sends the dispersion regulating modes to the tunable dispersion compensator control device 403 through control signaling.

Step 604, the tunable dispersion compensator control device 403 respectively and ordinally adjusts dispersion compensation amount of the tunable dispersion compensator of reference wavelength channel K and edge wavelength channels L and N according to control signaling, and respectively makes the performance parameters of reference wavelength channel K and edge wavelength channels L and N to satisfy requirements.

Step 605, the central control device 402 respectively records the dispersion compensation amount after the performance parameters of reference wavelength channel K and edge wavelength channels L and N have satisfied requirements.

Step 606, dispersion compensation amount of tunable dispersion compensator of adjacent wavelength channels of reference wavelength channel K and edge wavelength channels L and N is adjusted according to the dispersion compensation amount after the performance parameters of reference wavelength channel K and edge wavelength channels L and N have satisfied requirements in step 605 respectively, to make residual dispersion of all channels of wavelength division multiplexing optical transmission system to satisfy requirements, then return to step 601.

Figure 7:
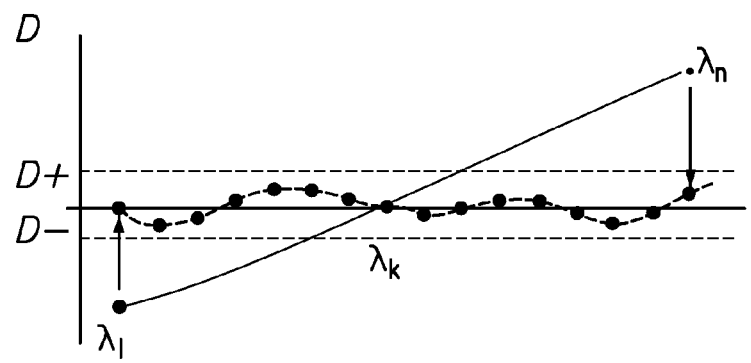
FIG. 7 is a schematic view showing the residual dispersion distribution of wavelength channels of wavelength division multiplexing optical transmission system before and after dynamic dispersion compensation of the present invention.

FIG. 7 is a schematic view showing the contrast of residual dispersion distribution of wavelength channels of wavelength division multiplexing optical transmission system before and after dynamic dispersion compensation of the present invention. As shown in FIG. 7, real curve is the schematic view of residual dispersion not performed dynamic dispersion compensation, while the dashed is that performed dynamic dispersion compensation. In the figure, the black points represent residual dispersion amount value of each wavelength channel after dynamic dispersion compensation. After the dynamic dispersion compensation of the present invention, after long distance transmission, residual dispersion value of each wavelength channel of wavelength division multiplexing optical transmission system is within the scope of dispersion tolerance permitted by receiver.

The present invention will be described with more detailed examples as follows.

Figure 8:
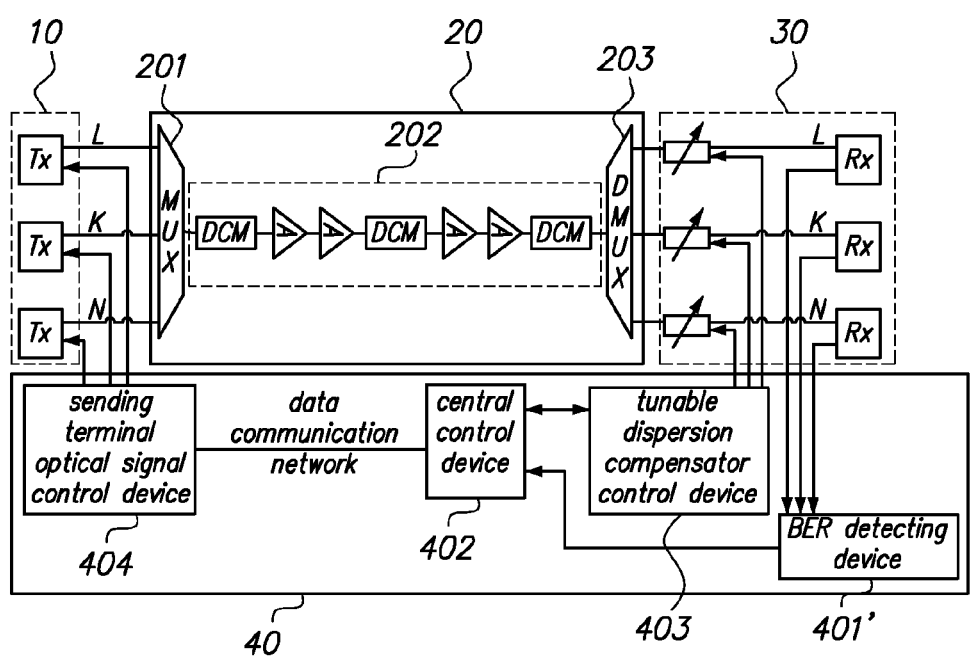
FIG. 8 is a schematic view showing the structure of wavelength division multiplexing system performing dispersion compensation by BER detection of the present invention.

As shown in FIGS. 5 and 8, in the wavelength division multiplexing system of the present invention, the performance parameter detecting device 401 at receiving terminal in FIG. 5 is specified to be a BER (bit error rate) detecting device 401'. The BER detecting device 401' adopts common methods of bit error testing, wherein OTU (optical transform unit) single board can be directly used to access SDH (synchronous digital hierarchy) signals, by connecting sending terminal to wavelength channels of system, the central control device 402 decides a dispersion regulating mode according to the performance parameters reported by BER detecting device 401', here the performance parameter is bit error rate, and sends the dispersion regulating mode to the tunable dispersion compensator control device 403 and the sending terminal optical signal control device 404 through control signaling. Dispersion compensation amount of tunable dispersion compensator is adjusted by the tunable dispersion compensator control device 403 to achieve dynamic control of dispersion compensation to make optical signal of receiving terminal to satisfy requirements of optical receiver.

Meanwhile, a bit error generator can be set at the sending terminal in the present invention to generate pseudo-random code modulation signal with a certain sequence length, and then the pseudo-random code modulation signal is sent to each wavelength channel of wavelength division multiplexing system. BER detecting device 401' detects the bit error rate of this specific pseudo-random code modulation signal to achieve dynamic control of dispersion compensation.

Meanwhile, the tunable dispersion compensator in FIGS. 5 and 8 is set at the receiving terminal of wavelength division multiplexing system or can also be set at the sending terminal or be set at the receiving and sending terminals thereof at the same time.

When BER (bit error rate) detecting device is used as the performance parameter detecting device, the method of residual dispersion compensation of wavelength division multiplexing system of the present invention can further comprises the following steps:

Step 1, BER detecting device 401' detects BER of reference wavelength channel K and edge wavelength channels L and N respectively and reports the detecting result to the central control device 402.

Step 2, the central control device 402 diagnoses dispersion curve excursion according to the BER detecting result reported by the performance parameter detecting device 401 and judges whether the performance parameters exceeds the limit. If "yes", proceed to Step 3, otherwise return to Step 1 and continue detecting BER and reporting the result.

Step 3, the central control device 402 switches the testing channel to reference wavelength channel K, whose wavelength is $\lambda_K$, wherein the principle of reference channel selection is that dispersion compensation amount is minimum. The central control device 402 decides a dispersion regulating mode according to the condition of bit error rate of the reference wavelength channel K and sends the dispersion regulating mode to the tunable dispersion compensator control device 403 through control signaling.

Step 4, the tunable dispersion compensator control device 403 adjusts the dispersion compensation amount of the tunable dispersion compensator of the reference wavelength channel K according to control signaling until the bit error rate of the reference wavelength channel K is smaller than $10^{-12}$, and records the dispersion compensation amount of the tunable dispersion compensator of the reference wavelength channel K at this time.

Step 5, repeating Step 3 and Step 4, respectively adjust the dispersion compensation amounts of the tunable dispersion compensator of edge wavelength channels L and N (whose wavelengths are respectively $\lambda_L$, and $\lambda_K$) until the bit error rates of edge wavelength channels L and N are smaller than $10^{-12}$, and record the dispersion compensation amounts of the tunable dispersion compensator of the edge wavelength channels L and N at this time.

Step 6, according to the dispersion compensation amounts of reference channel and edge channels, residual dispersion of other adjacent channels is properly adjusted so that residual dispersion of each wavelength channel of wavelength division multiplexing system is within the scope permitted by receiver, then return to step 1.

Figure 9:
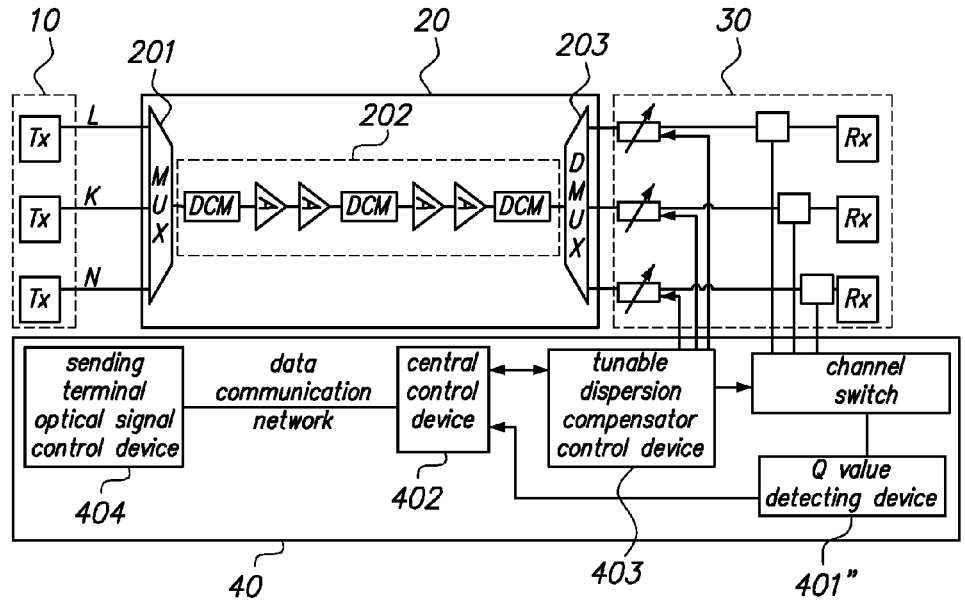
FIG. 9 is a schematic view showing the structure of wavelength division multiplexing system performing dispersion compensation by Q value detection of the present invention.

As shown in FIG. 5 and FIG. 9, in wavelength division multiplexing system of the present invention, the performance parameter detecting device 401 of receiving terminal in FIG. 5 is specified to be a Q value detecting device, a channel switch and a optical switch, which are connected ordinally, wherein:

The Q value detecting device is used for detecting Q value of the receiving terminal optical signal and sending the detecting result of Q value to the central control device. The optical switch set before a receiver is used for splitting a part of light from the receiving terminal optical signal and sending the part of light to the Q value detecting device through the channel switch.

The channel switch connected with and controlled by the tunable dispersion compensator control device is used for switching wavelength channels in the process of residual dispersion adjustment. When use the Q value detecting device as the performance parameter detecting device and use the BER (bit error rate) detecting device as the performance parameter detecting device, the processing flows of their residual dispersion compensation methods of wavelength division multiplexing system are basically the same, therefore it will not be described here again. BER detecting described above can be directly reported through OTU board of each channel, therefore channels do not need to be switched. The channel switch can be directly controlled by the tunable dispersion compensator control device and fixed in a certain channel.

Figure 10:
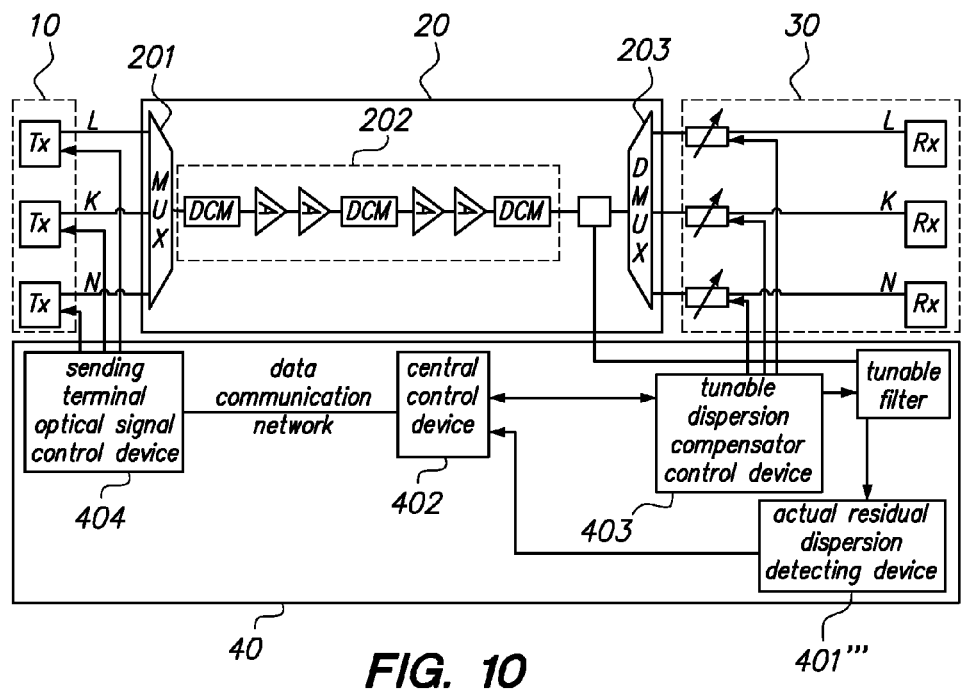
FIG. 10 is a schematic view showing the structure of wavelength division multiplexing system performing dispersion compensation by residual dispersion amount detection of an actual fiber channel of multiplexing section layer of the present invention.

As shown in FIG. 5, FIG. 8 and FIG. 10, in wavelength division multiplexing system of the present invention, a performance parameter detecting device of a receiving terminal in FIG. 5 comprises an actual residual dispersion detecting device, a tunable filter and a prismatic device, which are connected ordinally, wherein:

The actual residual dispersion detecting device is used for detecting residual dispersion amount of an actual fiber channel of receiving terminal and sending the detecting result of the residual dispersion amount of the actual fiber channel to the central control device.

The prismatic device is used for splitting a part of light from multiplexing section layer before a receiver and sending the light to the actual residual dispersion detecting device through the tunable filter.

The tunable filter connected with and controlled by the tunable dispersion compensator control device is used for switching wavelength channels in the process of residual dispersion adjustment. When use the actual residual dispersion detecting device 401''' as the performance parameter detecting device and use the BER (bit error rate) detecting device as the performance parameter detecting device, the processing flows of their residual dispersion compensation methods of wavelength division multiplexing system are basically the same, therefore it will not be described here again.

Figure 11:
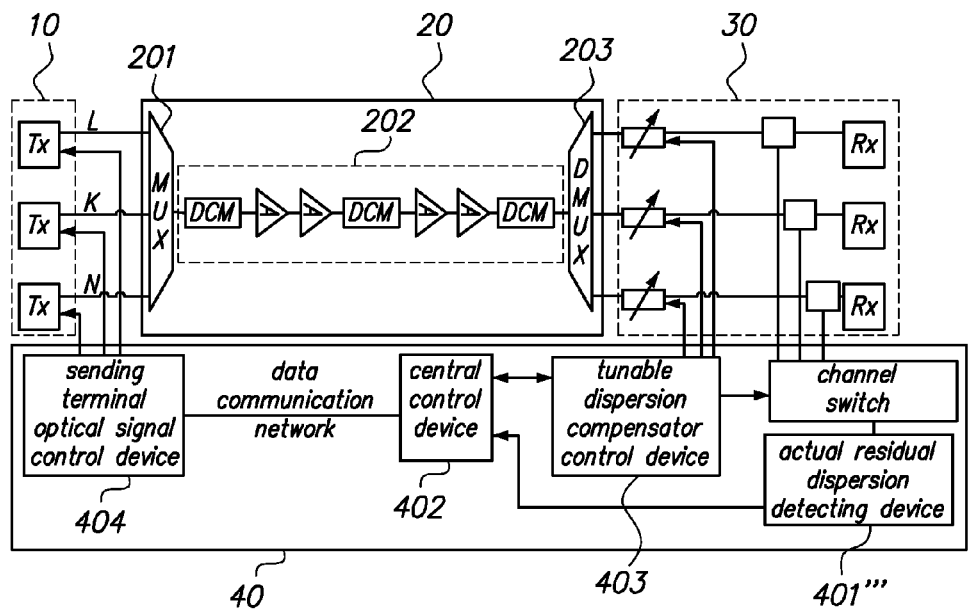
FIG. 11 is a schematic view showing two structures of wavelength division multiplexing system performing dispersion compensation by detecting residual dispersion amount of an actual fiber channel of the channel layer of the present invention.

As shown in FIG. 10 and FIG. 11, in the embodiment, the tunable dispersion compensator is controlled by detecting actual residual dispersion. Different from the embodiment of FIG. 10, the actual residual dispersion detecting device 401''' has different ways of obtaining light and switching channels. The performance parameter detecting device comprises an actual residual dispersion detecting device, a channel switch and an optical switch, which are connected ordinally, wherein:

The actual residual dispersion detecting device is used for detecting residual dispersion amount of an actual fiber channel of the receiving terminal and sending the detecting result of the residual dispersion amount of the actual fiber channel to the central control device. The optical switch set in front of the receiver is used for splitting a part of light from an optical signal of the receiving terminal and sending the light to the actual residual dispersion detecting device through the channel switch.

The channel switch connected with and controlled by the tunable dispersion compensator control device is used for switching wavelength channels in the process of residual dispersion adjustment.

Here, the optical switch can also be prismatic devices in other forms.

The processing flow of this mode of residual dispersion compensation of wavelength division multiplexing system is basically the same as those above, therefore it will not be described again.

Figure 12:
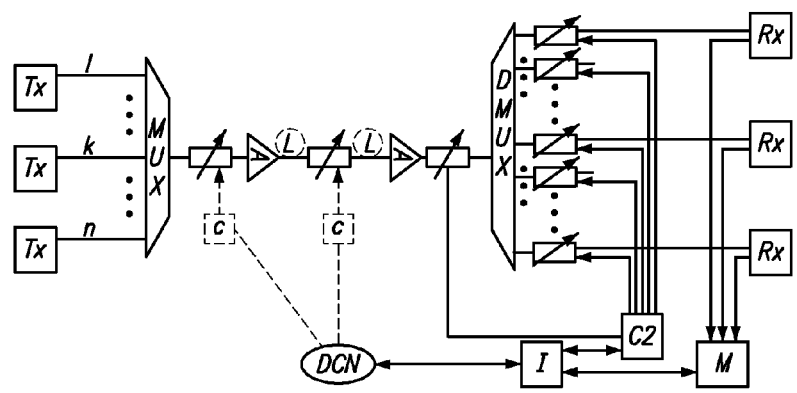
FIG. 12 is a schematic view showing the structure of wavelength division multiplexing system performing dispersion compensation in multiplexing section layer by a tunable dispersion compensator of the present invention.

In combination with FIG. 5 and FIG. 12, in the present invention, the dispersion compensation module of multiplexing section of wavelength division multiplexing system can also adopt a controllable tunable dispersion compensator instead of a traditional fiber dispersion compensator. Each tunable dispersion compensator can be adjusted by a tunable dispersion compensator control device to achieve dynamic control of dispersion compensation and make the receiving terminal optical signal to satisfy requirements of an optical receiver. The tunable dispersion compensator can only be controlled by a control device to function in a certain position of wavelength division optical transmission system. A tunable dispersion compensator in circuit at the receiving terminal does not function, nor can it be controlled by DCN to function in circuit. Additionally, the dashed represents many sections in the transmission fiber circuit can be used and can be long distance controlled by a principle control center, for example, a tunable dispersion compensator can substitute a traditional DCM device in every 80 km, whose control processing is the same as above.

The present invention further provides a method of residual dispersion compensation of wavelength division multiplexing system (i.e. a three points detecting control feeding back method) comprising the following steps: Step A, adjusting residual dispersion of two end wavelength channels of system according to the channel number of system; Step B, adjusting residual dispersion of a middle wavelength channel; and Step C, regulating the dispersion compensation amount of channels adjacent to the two end channels or the middle wavelength channel according to the regulating amount of dispersion compensation of the two end middle wavelength channels and the middle wavelength channel obtained in Step A and Step B.

Figure 13:
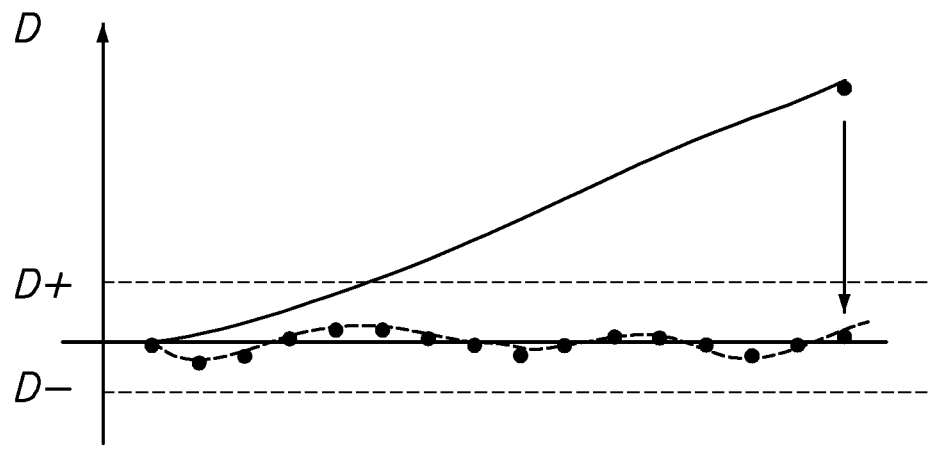
FIGS. 13 and 14 are schematic views showing the residual dispersion distribution of two special examples before and after dynamic dispersion compensation of the present invention.
Figure 14:
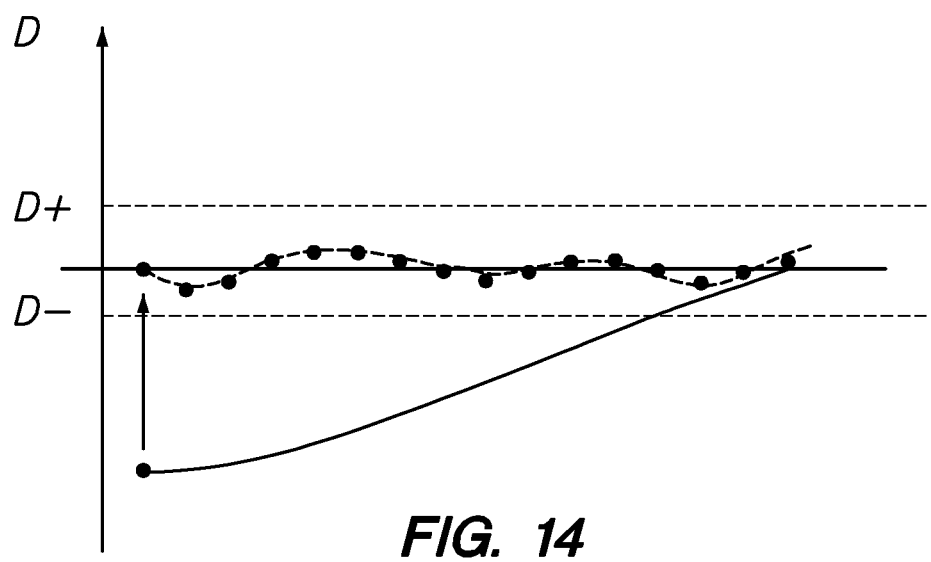

FIGS. 13 and 14 are special examples of the present invention. In FIG. 13, after concentrating dispersion compensation of multiplexing section, residual dispersion values of each wavelength channel of system are all positive residual dispersion values. As the real lines of FIG. 13 shown, the above three points detecting control feeding back method can be simplified to be a two points detecting control method, wherein only residual dispersion compensation amount of edge wavelength channels is detected and dispersion compensation amount of other adjacent channels is properly adjusted in reference to dispersion compensation amounts of the two edge channels, and finally residual dispersion of all channels of wavelength division multiplexing optical transmission system is compensated to be within the scope of dispersion tolerance permitted by a receiver as the dashed of FIG. 13 shown.

The difference between FIG. 13 and FIG. 14 is that FIG. 14 shows a special situation of negative residual dispersion values, which is not described here.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. A device for residual dispersion compensation of wavelength division multiplexing system, characterized in, comprising a performance parameter detecting device, a central control device and a tunable dispersion compensator control device, wherein the performance parameter detecting device is used for receiving and detecting a performance parameter of a receiving terminal optical signal, wherein the optical signal includes a highest wavelength channel and a lowest wavelength channel, and sending a detecting result of the performance parameter to the central control device, wherein the detecting result is the performance parameters for only the highest and the lowest wavelength channels;

the central control device is used for deciding a dispersion regulating mode of first and second tunable dispersion compensators according to the detecting result of the performance parameter and sending the dispersion regulating mode to the tunable dispersion compensator control device through control signaling; and the tunable dispersion compensator control device is used for receiving the control signaling sent by the central control device and adjusting dispersion compensation amounts of the first and second tunable dispersion compensators according to the control signaling in order to make residual dispersion of the highest and lowest wavelength channels satisfy requirements of dispersion tolerance of corresponding first and second optical receivers;

wherein the dispersion compensation amount of the first and second tunable dispersion compensators, when the residual dispersion of the highest and lowest wavelength channels satisfies the requirements of dispersion tolerance of the first and second optical receivers, is used to adjust dispersion compensation amount of a third tunable dispersion compensator of an adjacent wavelength channel having a wavelength greater than the lowest wavelength channel and less than the highest wavelength channel to satisfy a requirement of dispersion tolerance of a third optical receiver.

2. According to the device for residual dispersion compensation of wavelength division multiplexing system of claim 1, characterized in, further comprising an optical signal control device, connected with the central control device through digital communication network for adjusting and controlling a sending terminal light source according to the control signaling to make residual dispersion of the highest and lowest wavelength channels satisfy requirements of the corresponding first and second optical receivers.

3. According to the device for residual dispersion compensation of wavelength division multiplexing system of claim 1, characterized in, the performance parameter can be bit error rate of the receiving terminal optical signal.

4. According to the device for residual dispersion compensation of wavelength division multiplexing system of claim 1, characterized in, the performance parameter can be Q value of receiving terminal optical signal.

5. According to the device for residual dispersion compensation of wavelength division multiplexing system of claim 4, characterized in, the performance parameter detecting device comprising a Q value detecting device, a channel switch connected to the Q value detecting device, and a prismatic device connected to the channel switch, wherein:
the Q value detecting device is used for detecting Q value of the receiving terminal optical signal and sending detecting result of the Q value to the central control device;
the prismatic device set before a receiver is used for splitting a part of light from the receiving terminal optical signal and sending the part of light to the Q value detecting device through the channel switch; and
the channel switch connected with and controlled by the tunable dispersion compensator control device is used for switching wavelength channels in the process of residual dispersion adjustment.

6. According to the device for residual dispersion compensation of wavelength division multiplexing system of claim 1, characterized in, the performance parameter can be residual dispersion amount of an actual fiber channel of the receiving terminal optical signal.

7. According to the device for residual dispersion compensation of wavelength division multiplexing system of claim 6, characterized in, the performance parameter detecting device comprising an actual residual dispersion detecting device, a channel switch connected to the actual residual dispersion detecting device, and a prismatic device connected to the channel switch, wherein:
the actual residual dispersion detecting device is used for detecting residual dispersion amount of an actual fiber channel of the receiving terminal optical signal and sending detecting result of residual dispersion amount of the actual fiber channel to the central control device;
the prismatic device set before a receiver is used for splitting a part of light from the receiving terminal optical signal and sending the part of light to the actual residual dispersion detecting device through the channel switch; and
the channel switch connected with and controlled by the tunable dispersion compensator control device is used for switching wavelength channels in the process of residual dispersion adjustment.

8. According to the device for residual dispersion compensation of wavelength division multiplexing system of claim 6, characterized in, the performance parameter detecting device comprising an actual residual dispersion detecting device, a tunable filter connected to the actual residual dispersion detecting device, and a prismatic device connected to the tunable filter, wherein:
the actual residual dispersion detecting device is used for detecting residual dispersion amount of an actual fiber channel of the receiving terminal optical signal and sending detecting result of residual dispersion amount of the actual fiber channel to the central control device;
the prismatic device is used for splitting a part of light from multiplexing section layer before a receiver and sending the part of light to the actual residual dispersion detecting device through the tunable filter; and
the tunable filter connected with and controlled by the tunable dispersion compensator control device is used for switching wavelength channels in the process of residual dispersion adjustment.

9. A wavelength division multiplexing system, comprising an optical signal sending subsystem, an optical signal multiplexing section transmission subsystem and an optical signal receiving subsystem, characterized in, further comprising a device for residual dispersion compensation of wavelength division multiplexing system, which comprises a performance parameter detecting device, a central control device and a tunable dispersion compensator control device, wherein the performance parameter detecting device is used for receiving and detecting a performance parameter of a receiving terminal optical signal, wherein the optical signal includes a highest wavelength channel and a lowest wavelength channel, and sending a detecting result of the performance parameter to the central control device, wherein the detecting result is the performance parameters for only the highest and the lowest wavelength channels;
the central control device is used for deciding a dispersion adjusting mode of first and second tunable dispersion compensators according to the detecting result of the performance parameter and sending the dispersion adjusting mode to the tunable dispersion compensator control device through control signaling; and
the tunable dispersion compensator control device is used for adjusting dispersion compensation amounts of the first and second tunable dispersion compensators of a receiving terminal of wavelength division multiplexing system according to the control signaling to make residual dispersion of the highest and lowest wavelength channels satisfy requirements of dispersion tolerance of corresponding first and second optical receivers;
wherein the dispersion compensation amount of the first and second tunable dispersion compensators, when the residual dispersion of the highest and lowest wavelength channels satisfies the requirements of dispersion tolerance of the first and second optical receivers, is used to adjust dispersion compensation amount of a third tunable dispersion compensator of an adjacent wavelength channel having a wavelength greater than the lowest wavelength channel and less than the highest wavelength channel to satisfy a requirement of dispersion tolerance of a third optical receiver.

10. According to the wavelength division multiplexing system of claim 9, characterized in, the device for residual dispersion compensation of wavelength division multiplexing system further comprising:
a sending terminal optical signal control device connected with the central control device through digital communication network for adjusting and controlling a sending terminal light source according to the control signaling to make residual dispersion of the highest and lowest wavelength channels satisfy requirements of the corresponding first and second optical receivers.

11. According to the wavelength division multiplexing system of claim 9, characterized in, the performance parameter can be bit error rate of the receiving terminal optical signal.

12. According to the wavelength division multiplexing system of claim 9, characterized in, the performance parameter can be Q value of the receiving terminal optical signal.

13. According to the wavelength division multiplexing system of claim 12, characterized in, the performance parameter detecting device comprising a Q value detecting device, a channel switch connected to the Q value detecting device, and a prismatic device connected to the channel switch, wherein:
the Q value detecting device is used for detecting Q value of the receiving terminal optical signal and sending detecting result of the Q value to the central control device;
the prismatic device set before a receiver is used for splitting a part of light from the receiving terminal optical signal and sending the part of light to the Q value detecting device through the channel switch; and
the channel switch connected with and controlled by the tunable dispersion compensator control device is used for switching wavelength channels in the process of residual dispersion adjustment.

14. According to the wavelength division multiplexing system of claim 9, characterized in, the performance parameter can be residual dispersion amount of an actual fiber channel of the receiving terminal optical signal.

15. According to the wavelength division multiplexing system of claim 14, characterized in, the performance parameter detecting device comprising an actual residual dispersion detecting device, a channel switch connected to the actual residual dispersion detecting device, and a prismatic device connected to the channel switch, wherein:
the actual residual dispersion detecting device is used for detecting residual dispersion amount of an actual fiber channel of the receiving terminal optical signal and sending detecting result of residual dispersion amount of the actual fiber channel to the central control device;
the prismatic device set before a receiver is used for splitting a part of light from the receiving terminal optical signal and sending the part of light to the actual residual dispersion detecting device through the channel switch; and
the channel switch connected with and controlled by the tunable dispersion compensator control device is used for switching wavelength channels in the process of residual dispersion adjustment.

16. According to the wavelength division multiplexing system of claim 14, characterized in, the performance parameter detecting device comprising an actual residual dispersion detecting device, a tunable filter connected to the actual residual dispersion detecting device, and a prismatic device connected to the tunable filter, wherein:
the actual residual dispersion detecting device is used for detecting residual dispersion amount of an actual fiber channel of the receiving terminal optical signal and sending detecting result of residual dispersion amount of the actual fiber channel to the central control device;
the prismatic device is used for splitting a part of light from multiplexing section layer before a receiver and sending the part of light to the actual residual dispersion detecting device through the tunable filter; and
the tunable filter connected with and controlled by the tunable dispersion compensator control device is used for switching wavelength channels in the process of residual dispersion adjustment.

17. A method of residual dispersion compensation of wavelength division multiplexing system, characterized in, comprising the following steps:
Step A: a performance parameter detecting device receiving and detecting a performance parameter of a receiving terminal optical signal, wherein the optical signal includes a highest wavelength channel and a lowest wavelength channel, and sends a detecting result of the performance parameter to a central control device, wherein the detecting result is the performance parameters for only the highest and the lowest wavelength channels;
Step B: the central control device deciding a dispersion regulating mode of first and second tunable dispersion compensators according to detecting result of the performance parameter and sending the dispersion regulating mode to a tunable dispersion compensator control device through control signaling;
Step C: the tunable dispersion compensator control device adjusting dispersion compensation amounts of the first and second tunable dispersion compensators of a receiving terminal of wavelength division multiplexing system according to the control signaling to make residual dispersion of the highest and lowest wavelength channels satisfy requirements of dispersion tolerance of corresponding first and second optical receivers;
wherein the dispersion compensation amount of the first and second tunable dispersion compensators, when the residual dispersion of the highest and lowest wavelength channels satisfies the requirements of dispersion tolerance of the first and second optical receivers, is used to adjust dispersion compensation amount of a third tunable dispersion compensator of an adjacent wavelength channel having a wavelength greater than the lowest wavelength channel and less than the highest wavelength channel to satisfy a requirement of dispersion tolerance of a third optical receiver.

18. According to the method of residual dispersion compensation of wavelength division multiplexing system of claim 17, characterized in, the performance parameter can be bit error rate, Q value or residual dispersion amount of an actual fiber channel of the receiving terminal optical signal.

19. The method of claim 17, further comprising:
Step 1, adjusting residual dispersion of two channels with the longest and shortest wavelengths of the system according to a number of channels of the system;
Step 2, adjusting residual dispersion of a middle wavelength channel; and
Step 3, regulating dispersion compensation amount of channels adjacent to the two channels with the longest and shortest wavelengths or the middle wavelength channel according to adjusting amount of the residual dispersion of the two channels with the longest and shortest wavelengths and a channel with middle wavelength of a range of wavelengths obtained from the Step 1 and Step 2.

* * * * *